United States Patent [19]

Mittelhäuser

[11] Patent Number: 4,993,822
[45] Date of Patent: Feb. 19, 1991

[54] REARVIEW MIRROR FOR A MOTOR VEHICLE

[76] Inventor: Bernhard Mittelhäuser, Am Krähenberg, 3002 Wedemark 2, Fed. Rep. of Germany

[21] Appl. No.: 294,191

[22] Filed: Jan. 6, 1989

[30] Foreign Application Priority Data

Jan. 7, 1988 [DE] Fed. Rep. of Germany ....... 3800171

[51] Int. Cl.⁵ ............................ G02B 5/08; G02B 7/18
[52] U.S. Cl. .................................... 350/604; 350/634; 350/635; 350/637
[58] Field of Search ............... 350/632, 633, 634, 635, 350/636, 637, 611, 282

[56] References Cited

U.S. PATENT DOCUMENTS

| 4,570,893 | 2/1986 | Ballantyne | 350/636 |
| 4,660,944 | 4/1987 | Suzuki et al. | 350/635 |
| 4,783,161 | 11/1988 | Shamoto | 350/635 |
| 4,913,543 | 4/1990 | Haba et al. | 350/635 |

Primary Examiner—Bruce Y. Arnold
Assistant Examiner—James Phan
Attorney, Agent, or Firm—Robert W. Becker & Associates

[57] ABSTRACT

A rearview mirror for a motor vehicle. A mirror body is adjustably disposed in a housing that is pivotable about a vertical axis. Longitudinally shiftable adjustment elements are provided for the remote adjustment of the mirror body. So that this mirror can be tilted for safety reasons, the adjustment elements, in the vicinity of the interface between the housing and the base for the housing, are respectively provided with coupling halves for a pull and compression-resistant connection.

6 Claims, 1 Drawing Sheet

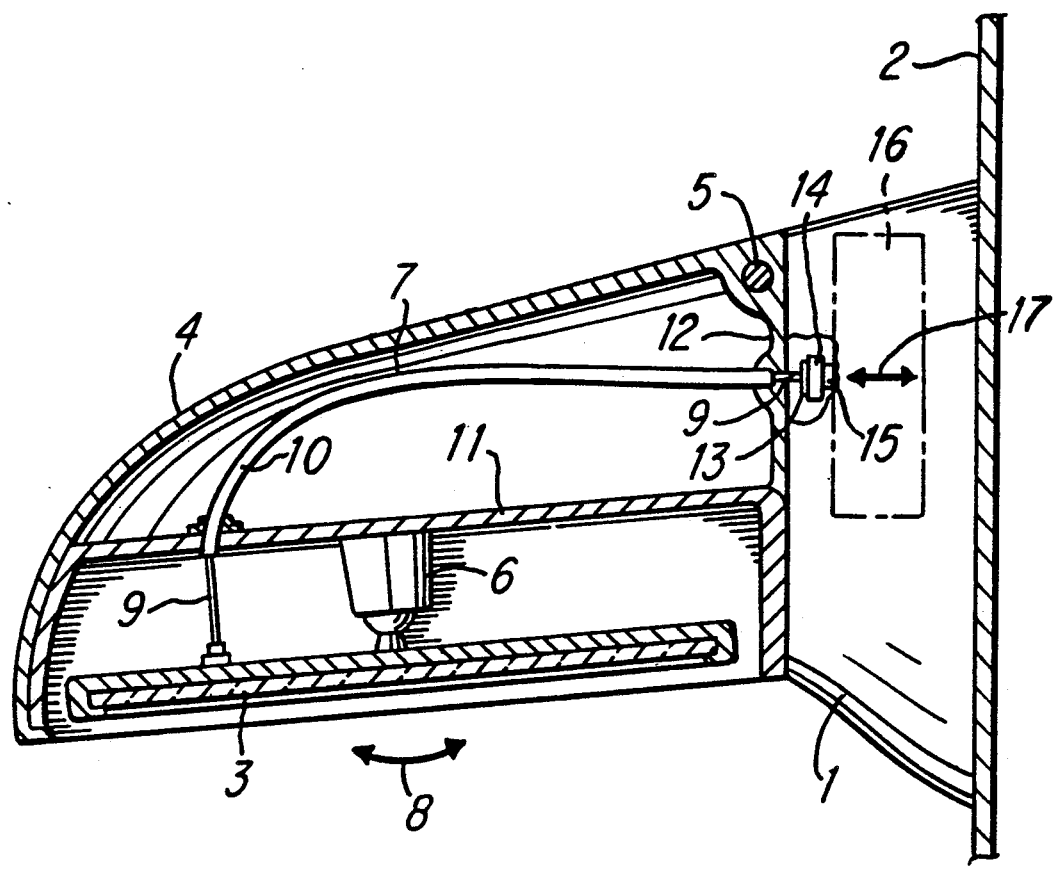

REARVIEW MIRROR FOR A MOTOR VEHICLE

BACKGROUND OF THE INVENTION

The present invention relates to a rearview mirror, especially an external mirror, for a motor vehicle. The mirror includes an approximately shell-like housing that is pivotably mounted, about an approximately vertical shaft, on a base that is secured to the vehicle, with an interface existing between the housing and the base. A mirror body is accommodated in the housing in such a way that it can be adjusted in all directions. Adjustment means are provided for the remote adjustment of the mirror body, with the adjustment means being embodied in the manner of Bowden cables and being adapted to be shifted in the longitudinal direction thereof.

This type of remote control or adjustment of rearview mirrors is relatively simple, since the adjustment means or elements can be easily shifted by hand. However, this adjustment presents difficulties with the aforementioned so-called tiltable mirrors where the housing can be pivoted or swung about a vertical axis, in or counter to the direction of travel, under the influence of impact, collision, etc. Furthermore, up to now this adjustment has not been very suitable for motorized control.

It is therefore an object of the present invention to embody a mirror of the aforementioned general type in such a way that it is tiltable and is equally suitable for either manual adjustment or for adjustment via a motor.

BRIEF DESCRIPTION OF THE DRAWING

This object, and other objects and advantages of the present invention, will appear more clearly from the following specification in conjunction with the accompanying schematic drawing, which is a horizontal cross-sectional view through one exemplary embodiment of the inventive external mirror for a passenger car.

SUMMARY OF THE INVENTION

The mirror of the present invention is characterized primarily in that the adjustment means that are provided for adjustment of the mirror body are, in the vicinity of the interface between the housing and the base, respectively provided with a first coupling half that is adapted to be connected in a pull and compression-resistant manner with a second coupling half of a shiftadjustment member that is adapted to effect shifting of the adjustment means.

This inventive construction enables a separation in the event that the housing is tilted away from the base, and above all also enables a selective utilization and installation of means to manually adjust and to connect motorized controls. Thus, the application possibilities for the mirror are considerably improved. In addition, the mirror manufacturer does not have to take into consideration whether adjustment is to be effected manually or with an electric motor. The means provided for manual adjustment or electric control receive the other or second coupling half in order in this manner to be able to undertake in a simple manner an installation either with a motor or with manual adjustment means.

In this connection, the coupling halves can have any desired construction; for example, even such that they bring about the coupling connection when the housing returns to its normal position after the coupling was previously separated as a consequence of the housing being tilted.

Further features of the present invention will be described in detail subsequently.

DESCRIPTION OF PREFERRED EMBODIMENTS

Referring now to the drawing in detail, the main components of the mirror are the base 1, which is fixedly secured to the outer surface 2 of the vehicle, and the approximately shell-like housing 4 that serves to accommodate the mirror body 3.

The rear edge of the housing 4 is mounted on the base 1 about a vertical shaft 5. It should be noted that such a pivotable mounting could also be provided at the forward lateral edge of the housing 4 in order under certain extraordinary operating conditions to be able to swing or tilt the housing 4, with the mirror body S, not only in the direction of travel of the vehicle but also in the opposite direction. Such mountings can be embodied in any desired fashion.

By means of a ball-and-socket joint 6, the mirror body S can be adjusted about a vertical axis and a horizontal axis, i.e. in all directions.

In order to be able to carry out such an adjustment, two Bowden cables 7 are provided. However, in the drawing only that cable 7 is illustrated that serves for the adjustment about the vertical axis in the direction of the double arrow 8. The second Bowden cable 7 can either engage directly behind or also in front of the ball-and-socket joint 6 on the rear side of the mirror body 3. In this connection, the wire ends 9 are securely connected in any desired manner to the rear surface of the mirror body 3, while the flexible outer cover 10 of the Bowden cable 7 is secured to the mounting support 11 for the ball-and-socket joint 6.

That end of the Bowden cable 7 remote from the mounting support 11 is secured to that wall 12 of the housing 4 that faces the vehicle. The end of the freely emerging wire 9 is provided with a small steel disk or plate 13 that is operatively connected with a magnet 14 of an adjustment member 15 of an electrical servomotor 16. This motor drives a non-illustrated spindle to shift the adjustment member 15 in the direction of the double arrow 17 and hence bring about a corresponding longitudinal displacement of the wire 9 within the outer cover 10. As a result, the desired adjustment of the mirror in the direction of the double arrow 8 is then achieved.

The components 13, 14 are the two halves of a coupling for transferring longitudinal forces in both directions to the wire 9. If as a result the housing 4 tilts, the magnetic coupling is separated; if the housing 4 is folded or tilted back into the normal position shown in the drawing, the two halves of the coupling come into mutual contact with one another approximately in the plane of separation between the base 1 and the housing 4, so that once again a coupling force that is adequate for the longitudinal displacement of the wire 9 can be transferred.

Although the aforementioned magnetic coupling offers certain advantages, it can be replaced by other couplings, preferably mechanical couplings via an interlocking and/or frictional connection. In this connection, it is also possible to utilize the tilting movement of the housing 4 for actuating or releasing the coupling action.

It is also important that in the absence of the servomotor 16, the coupling elements associated with the housing 4 should be allowed to cooperate with other coupling halves if instead of an adjustment with a motor, a manual adjustment is desired; this can be accomplished, for example, via an extension of the Bowden cables to a controller or the like with which shifting or displacement of the wires or cables 7 can be effected manually. In this case, no great alteration of the mirror construction is required; rather, all of the parts, with the exception of the servomotor 16, can still be used. It is merely necessary that in place of the servomotor 16 connecting elements for manual adjustment be installed.

The present invention is, of course, in no way restricted to the specific disclosure of the specification and drawing, but also encompasses any modifications within the scope of the appended claims.

What I claim is:

1. In a rearview mirror, especially an external mirror, for a motor vehicle, including an approximately shell-like housing that is pivotably mounted, about an approximately vertical shaft, on a base that is secured to said vehicle, with a mirror body being accommodated in said housing in such a way that it can be adjusted in all directions, and also including adjustment means for the remote adjustment of said mirror body, with said adjustment means being embodied in the manner of Bowden cables and being adapted to be shifted in a longitudinal direction thereof, the improvement wherein:

said adjustment means are respectively provided with a first coupling half that is adapted to be connected in a pull and compression-resistant manner with a second coupling half of a shift-adjustment member that is adapted to effect shifting of said adjustment means, with said first and second coupling halves being part of a coupling connection that is selectively actuatable and releasable as a function of pivoting movement of said housing.

2. A mirror according to claim 1, in which said first coupling half is operatively connected with said housing, and said second coupling half is operatively connected with said base.

3. A mirror according to claim 1, in which said first and second coupling halves are part of a magnetic coupling.

4. A mirror according to claim 1, in which said shift-adjustment member for said second coupling half is motor actuated.

5. A mirror according to claim 1, in which said shift-adjustment member for said second coupling half is manually actuated.

6. A mirror according to claim 1, which includes, for said shift-adjustment member for said second coupling shaft, a servomotor that is disposed in said mirror base.

* * * * *